United States Patent

Care

(10) Patent No.: US 8,814,462 B2
(45) Date of Patent: Aug. 26, 2014

(54) JOINT ASSEMBLY

(75) Inventor: Ian C. D. Care, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/493,111

(22) Filed: Jun. 11, 2012

(65) Prior Publication Data

US 2012/0328365 A1  Dec. 27, 2012

(30) Foreign Application Priority Data

Jun. 21, 2011 (GB) .................................. 1110436.1

(51) Int. Cl.

| | | |
|---|---|---|
| F16L 23/02 | (2006.01) | |
| F16B 5/02 | (2006.01) | |
| F01D 21/04 | (2006.01) | |
| F01D 25/24 | (2006.01) | |
| F16B 43/00 | (2006.01) | |

(52) U.S. Cl.
CPC ............ *F01D 21/045* (2013.01); *F16B 5/0241* (2013.01); *F16B 43/00* (2013.01); *F16B 5/0225* (2013.01); *F01D 25/243* (2013.01); *Y02T 50/672* (2013.01)
USPC .......................................... 403/337; 411/537

(58) Field of Classification Search
USPC .................. 403/335, 337, 408.1; 411/537
See application file for complete search history.

(56) References Cited

U.S. PATENT DOCUMENTS

| | | | | | |
|---|---|---|---|---|---|
| 815,581 | A | * | 3/1906 | Dean .............................. | 285/184 |
| 3,220,289 | A | * | 11/1965 | Farekas ........................... | 82/147 |
| 3,382,630 | A | * | 5/1968 | Chivers .......................... | 52/208 |
| 4,830,557 | A | * | 5/1989 | Harris et al. .................. | 411/113 |
| 4,850,732 | A | * | 7/1989 | Swanson ........................ | 403/29 |
| 4,906,036 | A | * | 3/1990 | James ............................ | 292/202 |
| 5,230,540 | A | * | 7/1993 | Lewis et al. .................... | 285/363 |
| 5,451,116 | A | * | 9/1995 | Czachor et al. ............... | 403/338 |
| 5,551,790 | A | * | 9/1996 | Melton .......................... | 403/28 |
| 5,697,650 | A | * | 12/1997 | Brown .......................... | 285/197 |
| 6,176,663 | B1 | * | 1/2001 | Nguyen et al. ................ | 411/368 |
| 6,305,899 | B1 | * | 10/2001 | Saunders ........................ | 415/9 |
| 6,364,569 | B1 | * | 4/2002 | Pascouet ....................... | 403/337 |
| 6,374,665 | B1 | * | 4/2002 | Somppi et al. ................. | 73/146 |
| 7,056,053 | B2 | * | 6/2006 | Schilling et al. ............. | 403/337 |
| 7,201,529 | B2 | * | 4/2007 | Lejeune ........................ | 403/2 |
| 2003/0118399 | A1 | * | 6/2003 | Schilling et al. ............. | 403/337 |
| 2004/0013495 | A1 | * | 1/2004 | Hassed ......................... | 411/537 |
| 2004/0169347 | A1 | * | 9/2004 | Seki ....................... | 280/124.134 |
| 2010/0129137 | A1 | * | 5/2010 | Heidari et al. ................... | 403/2 |

FOREIGN PATENT DOCUMENTS

GB       1 564 764 A       4/1980

OTHER PUBLICATIONS

Oct. 19, 2011 Search Report issued in British Patent Application No. GB1110436.1.

* cited by examiner

*Primary Examiner* — Joshua Kennedy
(74) *Attorney, Agent, or Firm* — Oliff PLC

(57) ABSTRACT

A joint assembly includes a first component with a flange containing a plurality of spaced through-holes; a second component with a joining portion having an end surface which faces the flange and containing a plurality of spaced elongate cavities; and a plurality of fixation devices. Each cavity extends into the joining portion from the end surface in alignment with one of the through-holes. Each fixation device includes: a bolt which extends through a respective through-hole and the corresponding cavity, and includes a nut which is embedded within the joining portion at the corresponding cavity to receive the bolt such that on tightening the nut and bolt a clamping force is exerted across the flange and the end surface to join the first and second components together. Under axial loads less than that causing bolt failure, each fixation device is deformable to remove the clamping force.

15 Claims, 3 Drawing Sheets

JOINT ASSEMBLY

TECHNICAL FIELD OF THE INVENTION

The present invention relates to a joint assembly, particularly, but not exclusively, to a joint assembly for gas turbine engines, and more particularly to a joint assembly for joining a gas turbine engine fan casing to an adjacent casing.

BACKGROUND OF THE INVENTION

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

A fan casing 24 surrounds the fan 12, and is typically joined at its rear end to a rear casing 25 at a point known as the A3 flange, and at its front end to the air intake casing 11 at a point known as the A1 flange. The fan casing 24 and the air intake 11 are typically joined together at a joint assembly which uses nuts and bolts, the shanks of the bolts arranged to pass axially through holes in annular radially extending flanges at the abutting ends of the fan casing 24 and the intake 11. A similar assembly typically joins the fan casing 24 to the rear casing 25.

As shown in FIG. 2, which is close-up view of a nut 26 and bolt pair connecting the annular flanges 27, 28 of an air intake 11 and a fan casing 24, it is customary to elongate the shank 30 of each bolt and provide a cylindrical collar 29 around the shank between the head 31 of the bolt and one of the flanges or between the nut 26 and one of the flanges. This increases the effective length of the shank and therefore the absolute axial extension of the shank prior to failure of the bolt. It is also possible for the cylindrical collar 29 to be a crushable collar such that at extreme loads the collars crushes to allow greater parting of the flanges 27, 28 prior to failure of the bolts.

During an extreme dynamic event, such as a fan-blade-off, the fan casing has initially to withstand the impact of the released fan blade. A few milliseconds later the compressor section surges and a pulse wave from the combustor passes through the fan casing. Following this, the out of balance rotor cause the other fan blades to rub and forces orbiting of the fan casing. The front joint assembly between the fan casing and the air intake has to reduce the transmission of orbiting forces to the intake while ensuring that the intake remains attached. The rear joint assembly between the rear casing and the fan casing has to withstand the surge pulse which urges the fan casing axially forward away from the rear casing and also expands the fan casing outwards due to the pressure in the pulse wave, but then must accommodate the forced orbiting of the fan casing. It is important that the bolts do not fracture and allow an "unzipping" of the flanges that would allow the intake to separate from the fan casing, or the fan casing to separate from the rear casing. It is also important that vibration transmitted to the aircraft is minimised. It is a regulatory certification requirement to perform a test in which a blade is deliberately released to prove that the engine is capable of accommodating such an unlikely event.

Focusing on the front joint assembly at the A1 flange, the crushing of the collars and extension of the bolt shanks can successfully absorb energy from the surge pulse. Further, the parted flanges of the joint assembly can accommodate forced orbiting of the fan casing 24, as the shanks, once the flanges are parted, are no longer forced to be parallel with the axes of the casings, i.e. they can rotate to an extent in the holes in the flanges thus reducing the forcing on the intake 11. However, particularly when the fan casing is formed of composite material, a joint assembly of the type shown in FIG. 2 can become impractical as large load spreaders and hole reinforcements are required to prevent damage to the composite, and these spreaders substantially increase the weight of the assembly.

Focusing on the rear joint assembly at the A3 flange, typically extendable bolts are used to absorb energy from the surge pulse whilst retaining the fan casing 24 coaxial with the rear casing 25. However, particularly when the fan casing 24 is formed of composite material, a joint assembly similar to the type shown in FIG. 2 can again become impractical as large load spreaders and hole reinforcements are required to prevent damage to the composite.

Thus there is a need for improved joint assemblies.

BRIEF SUMMARY OF THE INVENTION

Accordingly, in a first aspect, the present invention provides a joint assembly including:

a first component with a flange containing a plurality of spaced through-holes, a second component with a joining portion having an end surface which faces the flange, the joining portion containing a plurality of spaced elongate cavities, each cavity extending into the joining portion from the end surface in axial alignment with a respective one of the through-holes, and a plurality of fixation devices, each fixation device including a bolt with a shank which extends though a respective through-hole and the corresponding aligned cavity, and further including a nut which is embedded within the joining portion at the corresponding cavity to threadingly receive the shank such that on tightening the nut and the bolt a clamping force is exerted across the flange and the end surface to join the first and second components together;

wherein the fixation device is configured such that under axial loads less than those causing bolt failure the fixation device is deformable to remove the clamping force across the flange and the end surface.

Advantageously, by embedding the nut within the joining portion load can be transferred between the nut and the joining portion over a relatively large area, reducing the need for separate load spreaders.

Optional features of the invention will now be set out. These are applicable singly or in any combination with any aspect of the invention.

The joining portion, or indeed substantially the entire second component, may be formed out of composite material, e.g. fibre reinforced plastic material.

Each fixation device can further include a cylindrical collar which is arranged around the shank. The collar can increase the effective length of the shank, increasing the extension of the shank under axial loads less than those causing bolt failure to reduce or remove the clamping force. However, preferably the collar is crushable under axial loads less than those required for bolt failure, which can also reduce or remove the clamping force. The collar provides an additional advantage of reducing the length of the cavity and hence of the joining portion.

Each fixation device can further include a collar which is arranged around the shank, the collar being elastically deformable under axial loads less than those required for bolt failure to reduce or remove the clamping force. The elastically deformable collar can temporarily absorb at least some of the energy of a surge pulse, such as can occur in non-fan-blade-off events, thus helping to reduce peak loads in the joint assembly and forcing on other components.

At least a portion of the shank may be extendable under axial loads less than those required for bolt failure to increase the length of the shank and reduce or remove the clamping force. For example, at least a portion of the shank may have a smaller diameter than the portion of the shank that is threadingly received by the nut, the smaller diameter portion preferentially extending under such axial loads.

The nut can be configured such that it can articulate relative to the joining portion to allow the through-hole and the cavity to move out of axial alignment when the clamping force is removed. In this way, the joint assembly can accommodate lateral displacement of one component relative to the other. For example, when the first component is a fan casing and the second component is an air intake, the articulation of the nut can allow the joint assembly to accommodate forced orbiting of the fan casing while maintaining the attachment of the intake to the fan casing. The cavity may form an annular space around the shank such that, when the through-hole and the cavity move out of axial alignment, the shank is prevented from contacting the wall of the cavity. In this way, the bolt can avoid causing damage to the joining portion. Particularly if the joining portion is formed of composite material, such damage can initiate delamination or provide a crack initiation site. Likewise, the through-hole may form an annular space around the shank such that, when the through-hole and the cavity move out of axial alignment, the shank is prevented from contacting the side of the through-hole. In general, preventing contact between the shank and the sides of the cavity and the through-hole also helps to prevent damage to the shank, and therefore increases the reliability of the bolt.

The nut can have a curved outer surface and can be located in a conformal recess in the joining portion. In this way, the nut can slidingly rotate within the recess to allow the nut to articulate relative to the joining portion. For example, the nut can have a cylindrical outer surface which allows rotation of the nut about the axis of the cylinder. However, preferably, the nut has an outer surface corresponding to the surface of a sphere. The nut can then slidingly rotate within the recess in a plurality of angular directions, e.g. in the manner of a rose or heim joint. The conformal recess can be formed by a separate housing component located in the joining portion. Conveniently, the nut and the housing can be formed, for example, of phosphor bronze, which has good corrosion resistance and a relatively low friction coefficient for self-sliding. These are particularly useful properties when the nut and the housing may see sliding service once in its life. The materials for the nut and housing are preferably selected or coated so that they do not galvanically corrode when in contact with the material of the joining portion, such as a carbon fibre reinforced plastic.

The joint assembly may further include a restraining formation separate from the fixation devices which prevents or limits the first and second components from displacing laterally relative to each other when the clamping force is removed. In the case of a joint assembly connecting a fan casing to an air intake, the restraining formation can ensure that the fixation devices absorb some of the peak energy as they deform, allowing the flange and the end surface to move apart, before relative lateral displacement of the first and second components is unrestrained by the formation. In the case of a joint assembly connecting a rear casing to fan casing, the restraining formation can ensure that unrestrained relative lateral displacement does not occur, even after the fixation devices are deformed to their maximum extent.

The restraining formation can include an overlapping portion which extends from one of the first and second components and overlaps with the other of the first and second components to prevent the first and second components from displacing laterally relative to each other beyond the overlapping portion when the clamping force is removed. For example, the overlapping portion can be integral with one of the first and second components. Thus the first component can be an extension from the flange. Alternatively, however, the overlapping portion can be part of a separate component which is sandwiched between the end surface and the flange.

The restraining formation can include a plurality of spaced dowels, each dowel being embedded at one end in a respective recess formed in the flange and embedded at the other end in a respective recess formed in the end surface, the dowels limiting relative lateral movement of the first and second component when the clamping force is removed. Thus the dowels can perform a similar function to the overlapping portion. When used in conjunction with an overlapping portion, the dowels may be of different length to the overlapping portion, and thus limit relative lateral movement for a different period of time.

Typically, the flange is an annular flange, the through-holes being circumferentially distributed around the flange, and the end surface is an annular end surface which is coaxial with the annular flange, the elongate cavities being circumferentially distributed around the end surface (indeed, generally, the first and the second components are annular). When the restraining formation includes the overlapping portion, this can then be an annular overlapping portion which radially overlaps with the other of the first and second components. When the restraining formation includes the dowels, these can then be circumferentially distributed around the flange and the end surface. The dowels can thus limit relative rotational movement as well as relative lateral movement of the first and second components. The first and the second components can be casings. For example, the second component can be a fan casing. The first component can then be an air intake or a rear casing.

In a second aspect, the present invention provides a gas turbine engine including a joint assembly according to the first aspect.

BRIEF DESCRIPTION OF THE DRAWINGS

Embodiments of the invention will now be described by way of example with reference to the accompanying drawings in which:

FIG. 3 shows schematically a longitudinal cross-section through a joint assembly according to a first embodiment of the present invention at the A1 position connecting a composite material fan casing 124 and a typically metal air intake casing 111 of a turbofan engine. The intake has an annular flange 127 at its front end and the fan casing has an annular thickened joining portion 132 with an end face 133 at its rear end. The two casings are axially aligned and clamped together across the flange and end face by a plurality of fixation devices which are circumferentially distributed around the flange and the end face.

Figure 1:
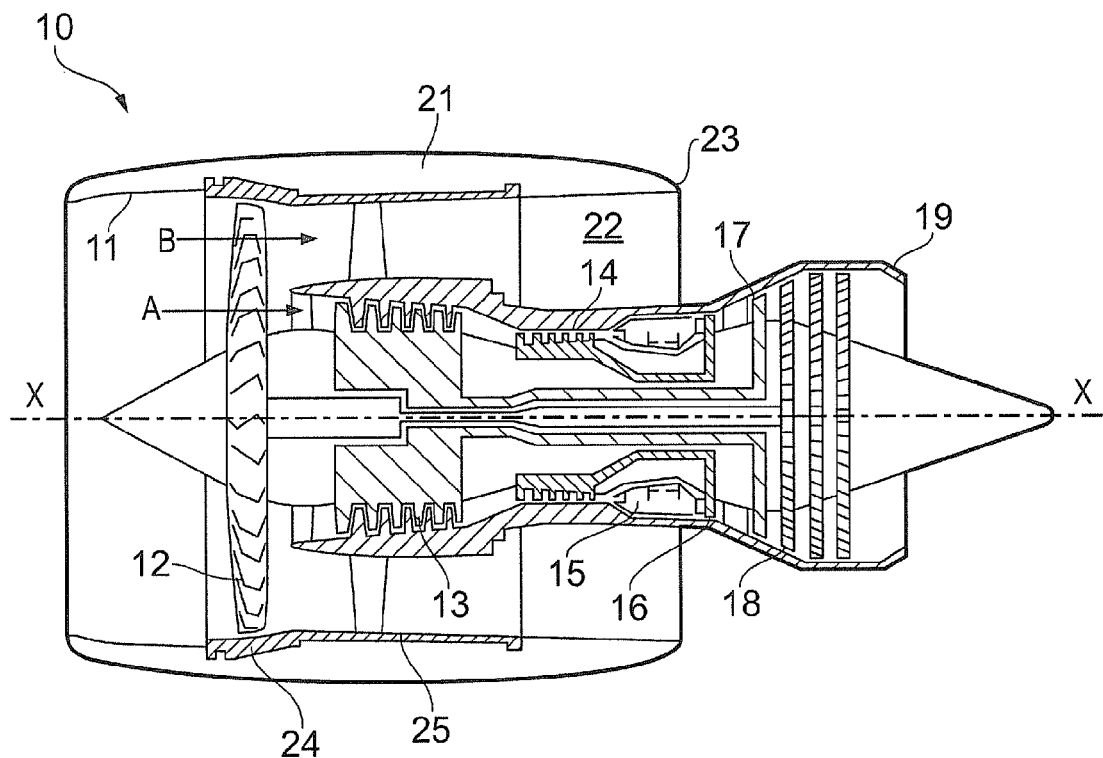
FIG. 1 shows schematically a longitudinal cross-section through a ducted fan gas turbine engine.

Each fixation device comprises a nut 126 and a bolt having a shank 130 and a head 131. The nut has a spherical outer surface 134 and is located in a conformal recess formed by a nut housing 135. The nut and the housing are embedded in the joining portion 132, with the nut positioned in an elongate cavity 136 formed in the joining portion and opening at the end face 133. The cavity is axially aligned with a matching through-hole 137 formed in the flange 127. The shank 130 of the bolt thus passes through the through-hole and into the cavity to thread into the nut. Both the cavity and the through-hole are over-sized relative to the shank to form respective annular spaces 141, 142 around the shank.

Between the head 131 of the bolt and the flange 127, a cylindrical collar 129 is arranged around the shank 130. The collar increases the effective length of the shank and is crushable as explained below. The shank has a portion 130a of reduced diameter which is preferentially extendable under axial loads, as also explained below.

The nut 126 and the housing 135 are a pre-assembled unit and function in the manner of a heim or rose joint. This unit can be suitably located in the joining portion 132 during the formation of the fan casing 124, or can be located therein after its formation through side hole 138 in the joining portion. The housing is fixed relative to the joining portion, but the nut can rotate in substantially all angular directions within the housing. The side hole 138 in the joining portion provides side access to the unit, such access being needed for insertion of a locking member (e.g. the flat of a screw driver) into aligned recesses (not shown) in the housing and the nut which prevent the nut from rotating when the shank is screwed therein. After the nut and bolt are secured together and a clamping force is exerted across the flange 127 and the end face 133, the hole 138 is plugged with airtight plugs 139 which are flush with the inner and outer surfaces of the joining portion, and prevent gas leakage through the hole, allowing the fan casing to function as a fire barrier.

Preferably the nut 126 and the housing 135 are formed of phosphor bronze, this alloy being corrosion resistant and having a relatively low self-sliding friction coefficient. However, the choice of materials and/or coatings for the nut 126 and housing 135 also depends on the materials used in the casing 124, as they generally need to be galvanically neutral. Galvanic neutrality can also be achieved by lining the side hole 138 with e.g. glass fibre reinforced plastic.

An overlapping portion 140 extends from the outer edge of the flange 127 to overlap on the radially outer side of the joining portion 132 when the flange and the end face 133 are clamped together.

In normal use, the joint assembly produces a strong, rigid and gastight interface between the fan casing 124 and the air intake 111. Under an extreme dynamic event, such as a fan-blade-off, however, the joint assembly operates to maintain the engine in a safe state. More particularly, the joint assembly can withstand and absorb energy from the surge pulse that occurs in the first few milliseconds of a fan blade off event, before adapting to accommodate any differential forced orbiting of the casings.

Figure 3:
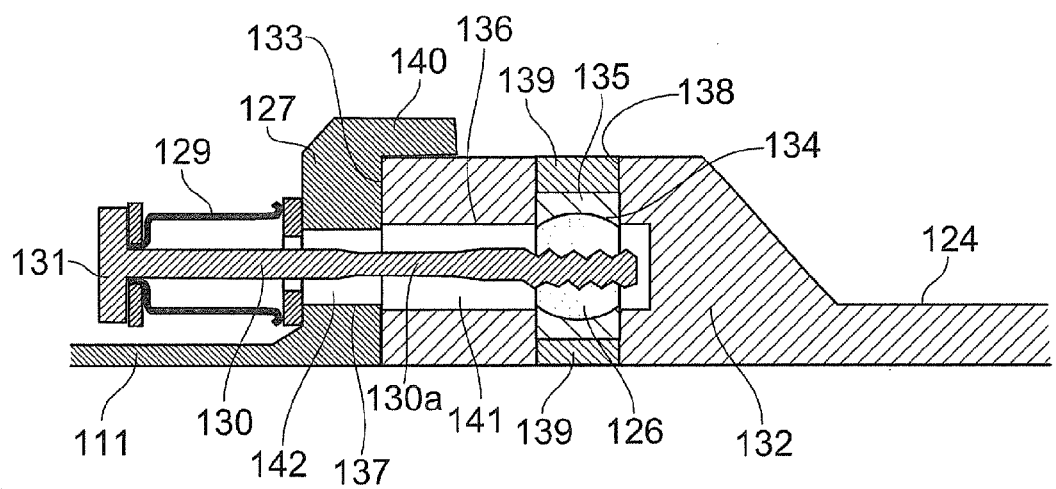
FIG. 3 shows schematically a longitudinal cross-section through a joint assembly according to a first embodiment of the present invention connecting a composite material fan casing and a typically metal air intake casing of a turbofan engine.
Figure 4:
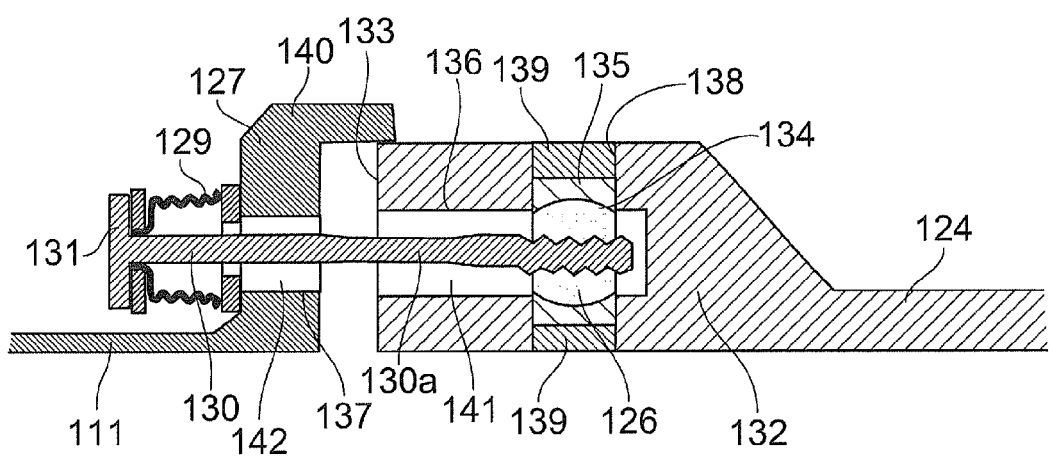
FIG. 4 shows schematically the joint assembly of FIG. 3 immediately after the surge pulse following a fan-blade-off event.

FIG. 4 shows schematically the joint assembly of FIG. 3 immediately after an event that has caused the collar to crush. For the A1 position this will happen due to the forcing of the fan casing and the relative stability of the intake. This forced separation of the intake 111 away from the fan casing 124 causes the collar 129 trapped between the bolt head 131 and the flange 127 to crush, absorbing energy, removing the clamping force, and allowing the flange and the end face 133 to part. The shank, having a relatively long effective length due to the set-back position of the nut 126 in the joining portion 132 and the additional length of the collar, extends plastically between the head and the nut, but preferentially in the portion 130a of reduced diameter. This process also absorbs energy and removes the clamping force.

Both the crushing of the collar 129 and the extension of the shank 130 occur at a level of axial load on the bolt which is significantly greater than the level experienced in normal use, but less than that needed to cause bolt failure. The precise level of the load at which the crushing and extension occur can be determined by careful design of the bolt and the collar.

The parting of the flange 127 and the end face 133 opens a gap therebetween. However, the overlapping portion 140 on the radially outer side of the joining portion 132 helps to prevent hot gases from the surge pulse exiting sideways through the gap.

Following the fan-blade-off event, the rotor becomes unbalanced, which in turn caused safety devices (not shown) to centre the rotor. Vibration from the out-of-balance rotor forces the surrounding structure, whilst the rotational speed of the fan reduces and finally windmills due to the forward speed of the aircraft. The fan casing 124 tends to be forced to orbit under the influence of the out of balance rotor. The joint assembly is able adapt to these circumstances because the elongated shank 130 and crushed collar 129 cause the gap between the flange 127 and the end face 133 to open to such an extent that the overlapping portion 140 no longer overlaps the outer surface of the joining portion 132, whereby the intake 111 can displace laterally relative to the fan casing.

Figure 5:
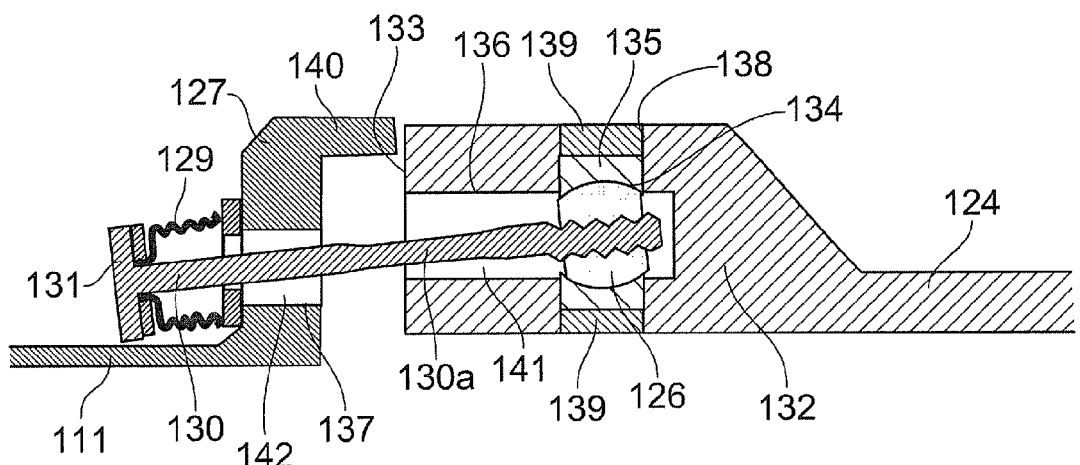
FIG. 5 shows schematically the joint assembly of FIG. 3 during forced orbiting of the fan casing during windmilling following a fan-blade-off event.

As illustrated in FIG. 5, which shows schematically the joint assembly of FIG. 3 during forced orbiting of the fan casing 124, under such lateral displacement the elongate cavity 136 and the through-hole 137 are no longer axially aligned. The nut 126, however, is able to rotate within the limits of the housing 135, allowing the threaded end of the shank 130 to move with the nut (and hence the fan casing) while the other end of the bolt stays connected to the flange 127. The joint assembly is able, therefore, to accommodate the forced orbiting and keeps the intake 111 safely attached to the fan casing 124, whilst also helping to decouple vibration between the two casings.

The annular spaces 141, 142 formed by the cavity and the through-hole around the shank help to prevent the shank from contacting the sides of the cavity and the through-hole. This can reduce the likelihood of damage to particularly the shank and the composite material of the joining portion 132.

Figure 6:
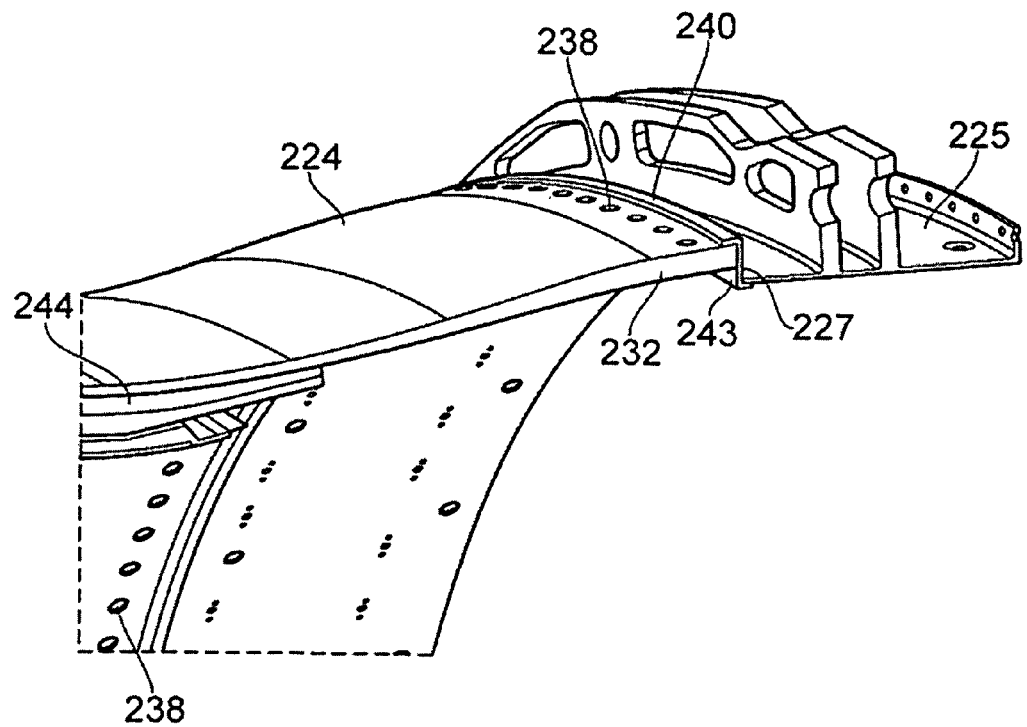
FIG. 6 shows a perspective view of a part of a fan casing and rear casing having a joint assembly according to a second embodiment of the present invention.

FIG. 6 shows a perspective view of a part of a fan casing 224 and rear casing 225 having a similar joint assembly at the A3 position according to a second embodiment of the present invention. The joint assembly is similar to that shown in of the first embodiment. The positions of the holes 238 in the fan casing, which provide side access to the nut and housing units, are visible. In this joint assembly, the overlapping portion 240, instead of being integral with the flange 227 of the rear casing, is part of a Z-section annular body 243, which is sandwiched between the end surface of the joining portion 232 and the flange.

The joint assembly of the second embodiment functions in a similar manner to that of the first embodiment. However, an important different is that the when the gap between the flange 227 and the end face of the joining portion 232 has opened to its maximum extent, the overlapping portion 240 still overlaps the outer surface of the joining portion. The forced orbiting of the fan case is thus always constrained by the overlapping portion at the rear end of the fan case. This helps to prevent additional load being placed on the joint assembly between the fan casing and the air intake.

The separation initiates due to the surge pulse coupled with the impact of the blade onto the fan casing 224. As with the A1 position, this causes the collar trapped between the bolt head and the flange 227 to crush, absorbing energy, removing the clamping force, and allowing the flange and the end face to part. The shank, having a relatively long effective length due to the set-back position of the nut in the joining portion 232 and the additional length of the collar, extends plastically between the head and the nut, but preferentially in the portion of reduced diameter. This process also absorbs energy and removes the clamping force.

The fan casing 224 has a liner 244 including honeycomb spacer and an abradable layer at its inner surface. To better show the Z-section annular body 243, the liner is only partly shown in FIG. 6. In reality, the fan case liner continues rearwards to terminate at the body 243, with the inner surface of the liner approximately flush with the inner surface of the rear casing 225 acoustic liner (not shown).

Figure 7:
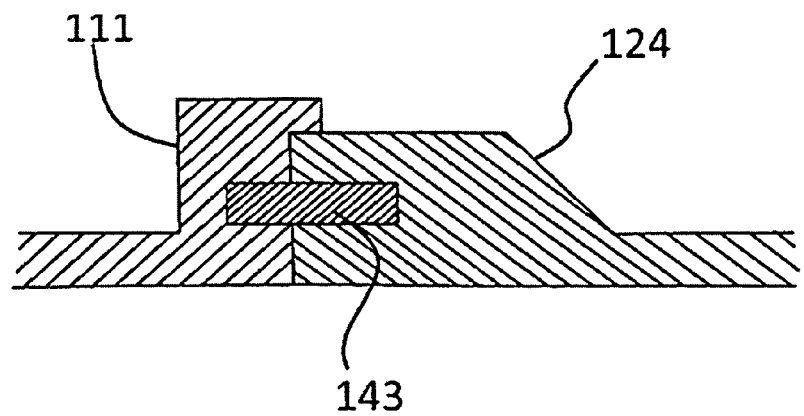
FIG. 7 shows schematically one of a plurality of dowels which are circumferentially distributed around the end face and flange.

The joint assembly may have other restraining formations in addition to or in place of the overlapping portion. For example, FIG. 7 shows one of a plurality of dowels 143 which are circumferentially distributed around the end face and flange, each dowel being embedded at one end in a recess in the flange and at the other end in a recess in the end face. Typically, three or four equally circumferentially spaced dowels 143 are used. The dowels 143, as well as providing lateral restraint like the overlapping portion, can also limit relative rotational movement of the fan casing and the rear casing. The dowels 143 can be of a length such that one end exits from its respective recess when the shanks of the bolts are extended and the collars crushed, to allow the joint assembly to accommodate the forced orbiting. The dowels 143 can also help to ensure the shanks do not touch the edges of the cavities and through-holes whilst the shanks elongates, and can further help the collars to crush in an even manner, as shown in FIG. 4.

Another option is to use a nut having a cylindrical rather than a spherical outer surface. Although this limits the articulation to rotation in one plane, this can still be sufficient to accommodate a degree of forced orbiting.

Figure 2:
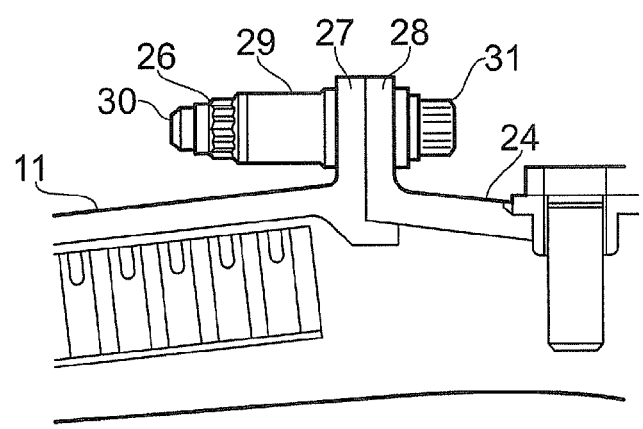
FIG. 2 shows a schematic side view of a nut and bolt pair connecting annular flanges of a fan casing and an air intake casing.

Although it can be advantageous to use a joint assembly according to the present invention at both the A1 (forward) and A3 (rearward) positions on the fan casing, this is not essential. For example a joint assembly according to the present invention can be used at the A3 position, while a joint assembly like that shown in FIG. 2 can be used at the A1 position.

While the invention has been described in conjunction with the exemplary embodiments described above, many equivalent modifications and variations will be apparent to those skilled in the art when given this disclosure. For example, although described above in relation to an annular flange and annular joining portion in an aerospace application, such a joint assembly may also be used to join non-annular components and indeed in non-aerospace applications. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A joint assembly including:
   a first component with a flange containing a plurality of spaced through-holes,
   a second component with a joining portion having an end surface which faces the flange, the joining portion containing a plurality of spaced elongate cavities, each elongate cavity extending into the joining portion from the end surface in axial alignment with a respective one of the through-holes, and
   a plurality of fixation devices, each fixation device including a bolt with a shank which extends through a respective through-hole and the corresponding aligned elongate cavity, and further including a nut having a curved outer surface which is embedded within a curved recess in the joining portion within the corresponding elongate cavity to threadingly receive the shank such that on tightening the nut and the bolt a clamping force is exerted across the flange and the end surface to join the first and second components, wherein:
   each fixation device is configured such that under axial loads less than those causing bolt failure the fixation device is deformable to remove the clamping force across the flange and the end surface;
   the curved outer surface of the nut and the curved recess in the joining portion are configured to prevent movement of the nut relative to the curved recess in a direction parallel to a longitudinal direction of the shank, and permit a sliding rotation of the nut within the curved recess relative to the joining portion; and
   the curved recess is provided in a housing embedded within the joining portion and is in communication with the elongate cavity of the second component.

2. The joint assembly according to claim 1, wherein the second component is formed substantially entirely of composite material.

3. The joint assembly according to claim 1, wherein each fixation device further includes a collar which is arranged around the shank, the collar being crushable under axial loads less than those required for bolt failure to reduce or remove the clamping force.

4. The joint assembly according to claim 1, wherein each fixation device further includes a collar which is arranged around the shank, the collar being elastically deformable under axial loads less than those required for bolt failure to reduce or remove the clamping force.

5. The joint assembly according to claim 1, wherein at least a portion of the shank has a smaller diameter than a portion of the shank that is threadingly received by the nut, the smaller diameter portion preferentially extending under axial loads less than those required for bolt failure to increase a longitudinal length of the shank and reduce or remove the clamping force.

6. The joint assembly according to claim 1, wherein the nut is configured such that it can articulate relative to the joining portion to allow the through-hole and the elongate cavity to move out of axial alignment when the clamping force is removed.

7. The joint assembly according to claim 6, wherein the elongate cavity forms an annular space around the shank such that, when the through-hole and the elongate cavity move out of axial alignment, the shank is prevented from contacting the wall of the elongate cavity.

8. The joint assembly according to claim 1, wherein the nut has an outer surface corresponding to the surface of a sphere, whereby the nut can slidingly rotate within the curved recess in a plurality of angular directions.

9. The joint assembly according to claim 1, further including a restraining formation separate from the fixation devices which prevents or limits the first and second components from displacing laterally relative to each other when the clamping force is removed.

10. The joint assembly according to claim 9, wherein the restraining formation includes an overlapping portion which extends from one of the first and second components and overlaps with the other of the first and second components to prevent the first and second components from displacing laterally relative to each other beyond the overlapping portion when the clamping force is removed.

11. The joint assembly according to claim 10, wherein the overlapping portion is integral with one of the first and second components.

12. The joint assembly according to claim 10, wherein the overlapping portion is part of a separate component which is sandwiched between the end surface and the flange.

13. The joint assembly according to claim 10, wherein the restraining formation includes a plurality of spaced dowels, each dowel being embedded at one end in a respective recess formed in the flange and embedded at the other end in a respective recess formed in the end surface, the dowels limiting relative lateral movement of the first and second component when the clamping force is removed.

14. The joint assembly according to claim 1, wherein the flange is an annular flange and the through-holes are circumferentially distributed around the flange, and the end surface is an annular end surface which is coaxial with the annular flange, the elongate cavities being circumferentially distributed around the end surface.

15. The joint assembly according to claim 1, wherein the second component includes a slide hole through which the housing can be inserted into and embedded within the joining portion.

* * * * *